UNITED STATES PATENT OFFICE.

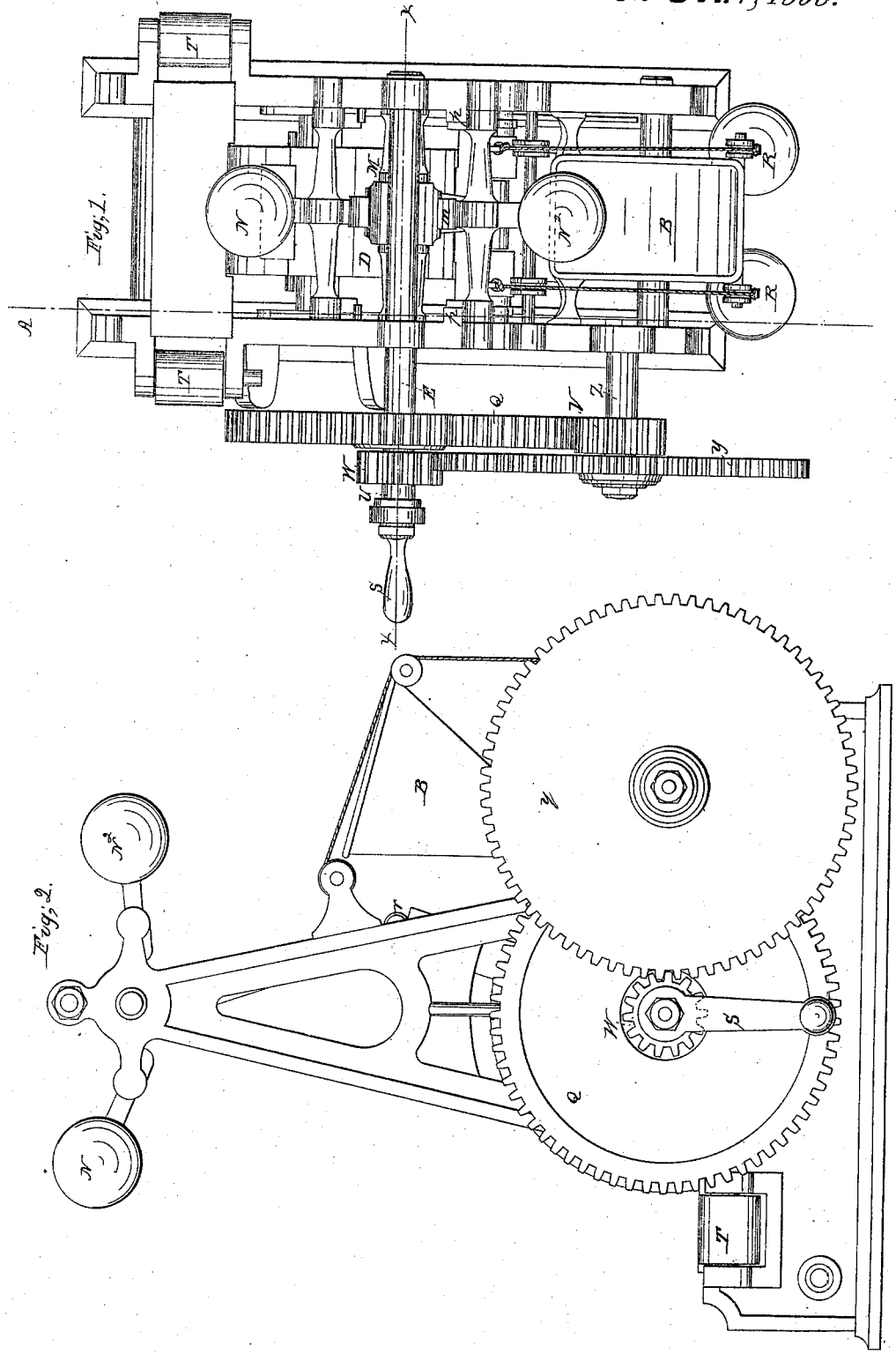

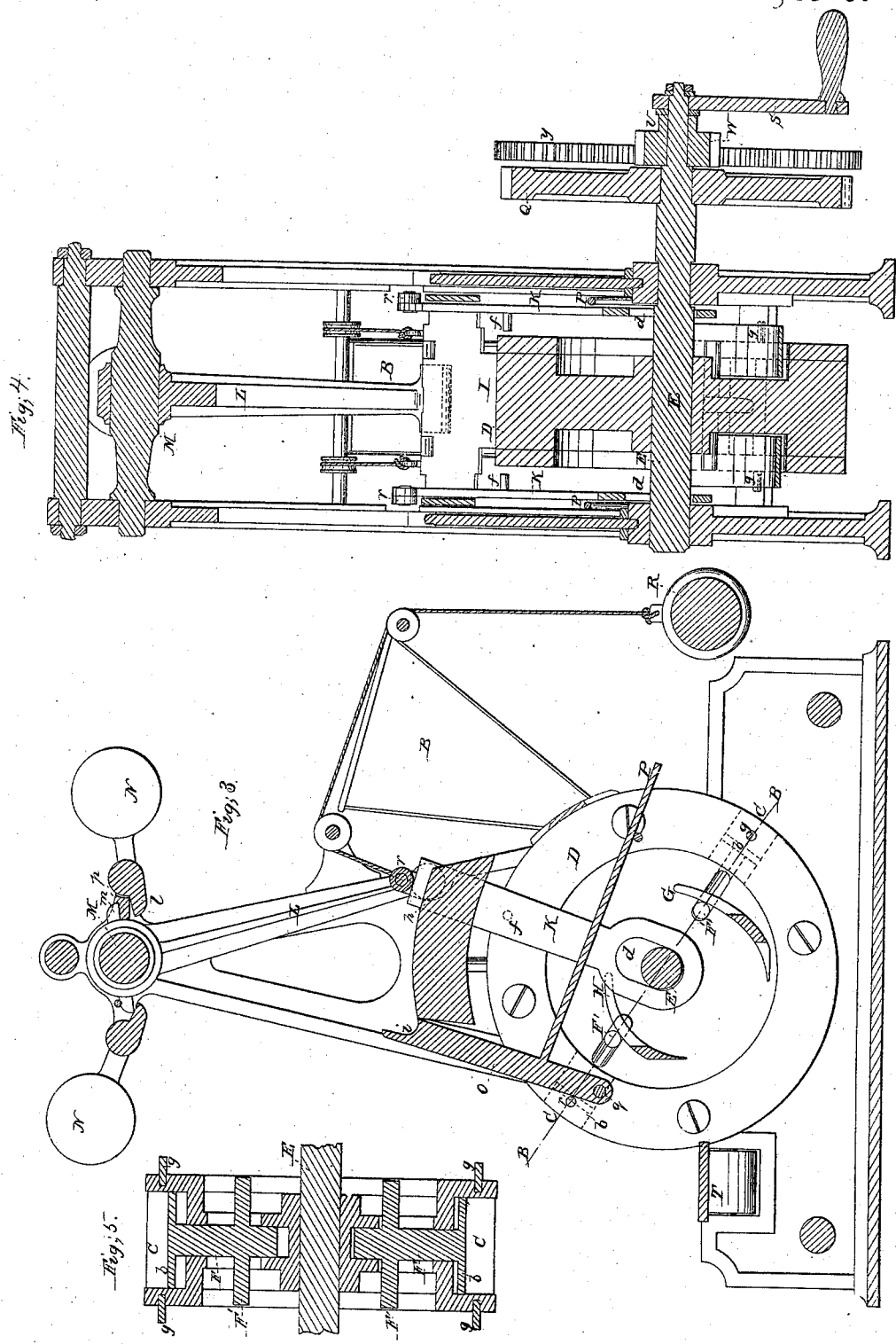

GEORGE ICHABOD WASHBURN AND EPHRAIM H. BELLOWS, OF WORCESTER, MASSACHUSETTS.

BRICK-MACHINE.

Specification of Letters Patent No. 15,863, dated October 7, 1856.

*To all whom it may concern:*

Be it known that we, G. I. WASHBURN and E. H. BELLOWS, of Worcester, in the county of Worcester and State of Massachusetts, have invented a new and useful Machine for Making Bricks of Dry Clay, which we call a "Lever Brick-Press," and of which the following is a full, clear, and exact description, reference being had to the accompanying drawings, making part of this specification, in which—

Figure 1 is a plan, Fig. 2 a side view, Fig. 3 a section upon the line A A of Fig. 1, Fig. 4 a section upon the line X X of Fig. 1, Fig. 5 a section through one of the bottoms of the molds on the line B, B of Fig. 3.

In our improved press, the clay after being suitably dried and powdered is thrown into molds arranged in the periphery of a revolving wheel or cylinder, where it is subjected to a powerful pressure, the finished brick being afterward ejected onto an endless apron as will be hereafter more fully described.

In the said drawings B represents the hopper into which the dry powdered clay is placed, and from an opening $a$ in the bottom of which, it is delivered to the molds beneath. These molds C are arranged in the periphery of the cylinder D which is secured to the shaft E, the latter turning in boxes in the framework. The bottoms $b$ of the molds are movable and are secured to the piston F from which project the rods F′ which are operated by the stationary cams G and H, by which means the bottom is thrown up or down as will be presently described.

I is the plunger which enters the mold for the purpose of compressing the clay; this plunger is secured to the radial arms K that turn freely around the shaft E, the slots $d$ allowing them to play up and down as the plunger rises and falls. The plunger is forced into the mold by what may be called an open or disconnected toggle as follows: L is an arm secured to the shaft M which turns in boxes in the frame work, when not otherwise operated this shaft is retained in a vertical position by the weights N, $N^2$, as seen in Fig. 3, $f$ seen dotted in Fig. 3 are pins projecting in from the radial arms K. $g\ g$ are pins which project out from the cylinder D, and as the latter revolves, strike against the pins $f$, and carry the arms and plunger around with the cylinder; this takes place at the instant when the plunger is opposite the mouth of one of the molds. The arm L at its lower end rests in a suitable bed or cavity $h$ (seen dotted in Fig. 3) in the top of the plunger. As now the plunger is carried forward with the cylinder, it is forced down into the mold, and the requisite pressure is put upon the clay. As the plunger passes the center the arm L escapes from the cavity $h$ and is carried back to its vertical position by the weight $N^2$, the tooth $l$ attached to which bears upon a corresponding tooth $m$ attached to the arm, and moves it until the motion of the tooth $l$ is arrested by another tooth or block $p$ projecting from the frame work.

As the plunger continues around with the cylinder, after the escape of the lever L as just described, it is withdrawn from the mold as follows: $r$ are rollers attached to the plunger which strike against the arms O pivoted to the frame at $q$; these arms are forced back by the plunger and as their upper extremities lie immediately beneath the rollers, the latter are raised and thus the plunger is drawn out of the mold; at the same instant the pin $f$ escaping from the pin $g$ upon the cylinder permits the plunger to be carried back ready to be again operated when the next mold comes around. The plunger is drawn back by weights R and carries with it the arm L as seen in Fig. 3.

It now remains to show the manner in which the finished brick is ejected from the mold; this is effected by the cam H against which the rod F′ strikes, and thus the bottom of the mold is forced out and the brick is delivered upon an endless apron running upon rollers T. The arms O are brought back to the position ready for operation (Fig. 3) by the weight of the rod P attached thereto. It will be observed that were it not for the peculiar action of the disconnecting toggle or arm L whereby this arm is released from the plunger before the latter commences to rise, it would not be possible to carry back the plunger after it was withdrawn from the mold.

The machine is set in motion by power applied to the crank S which is attached to a sleeve U which runs upon the shaft E and also carries the pinion W; this pinion engages with an intermediate wheel Y upon a short shaft Z, which carries another pinion V, by which the wheel Q is driven, this wheel is secured to the shaft E and thus the operating parts of the machine are set in motion.

What we claim as our invention and desire to secure by Letters Patent is—

1. The combination of the balanced arm L with the weighted reciprocating plunger I, operating in the manner and for the purpose substantially as herein set forth.

2. We claim the means by which the plunger is locked with and disconnected from the cylinder D consisting essentially of the pins $f$ and $g$ and the arms O operating in the manner substantially as herein described.

GEORGE ICHABOD WASHBURN.
EPHRAIM H. BELLOWS.

Witnesses:
ICHABOD WASHBURN,
JAMES A. KENDALL.